United States Patent

[11] 3,554,217

| [72] | Inventors | Henry Ehrens<br>Bayside, N.Y.;<br>Sidney Weiner, Cresskill, N.J. |
|---|---|---|
| [21] | Appl. No. | 817,990 |
| [22] | Filed | Apr. 21, 1969 |
| [45] | Patented | Jan. 12, 1971 |
| [73] | Assignee | Sealed Unit Parts Co., Inc.<br>Allenwood, N.J.<br>a corporation of New York |

[54] SELF-TAPPING VALVE
14 Claims, 6 Drawing Figs.

[52] U.S. Cl. .................................................. 137/318,
77/38, 222/91, 285/197
[51] Int. Cl. .................................................. F16k 41/04
[50] Field of Search .......................................... 137/317-
—323; 285/197, 198, 199; 77/37, 38, 39, 40, 41,
42; 222/88, 89, 91, 552

[56] References Cited
UNITED STATES PATENTS

| 1,795,430 | 3/1931 | Howie et al. ................... | 222/91 |
| 1,812,907 | 7/1931 | Tell .............................. | 77/37 |
| 3,448,758 | 6/1969 | Mullins ......................... | 137/318 |
| 3,450,149 | 6/1969 | Brinda .......................... | 137/318 |

*Primary Examiner*—William F. O'Dea
*Assistant Examiner*—David R. Matthews
*Attorney*—Yuter & Fields ABSTRACT: A valve for tapping a fluid carrying member comprising a valve body provided with a through bore which communicates with a fluid passageway. The body is adapted to rest matingly with the member and to be connected therewith. Movably received in the bore is a piercing element having a passage therethrough. Axially movably received in the bore is a valve stem which is movable in a first direction to engage and to initially move the piercing element to cause the element to pierce the fluid carrying member, and in a second direction away from said piercing element. The valve stem is provided with a piercing element engaging surface for sealing the piercing element passage when the valve stem engages the piercing element to prevent fluid flow therethrough.

PATENTED JAN 12 1971 3,554,217

INVENTORS
HENRY EHRENS
SIDNEY WEINER
BY
Yuter + Spiecens

ATTORNEYS.

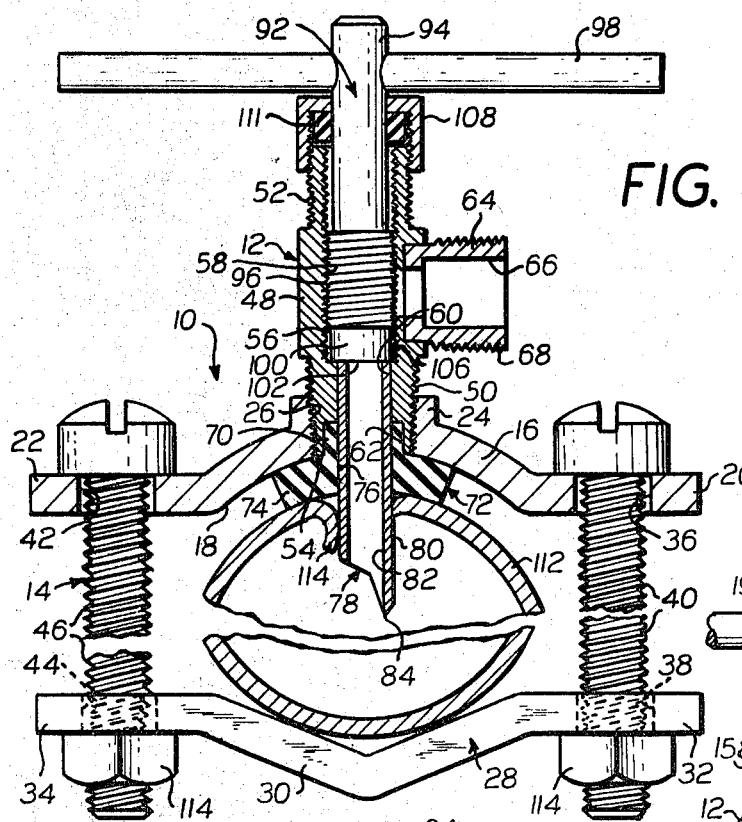
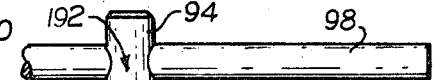
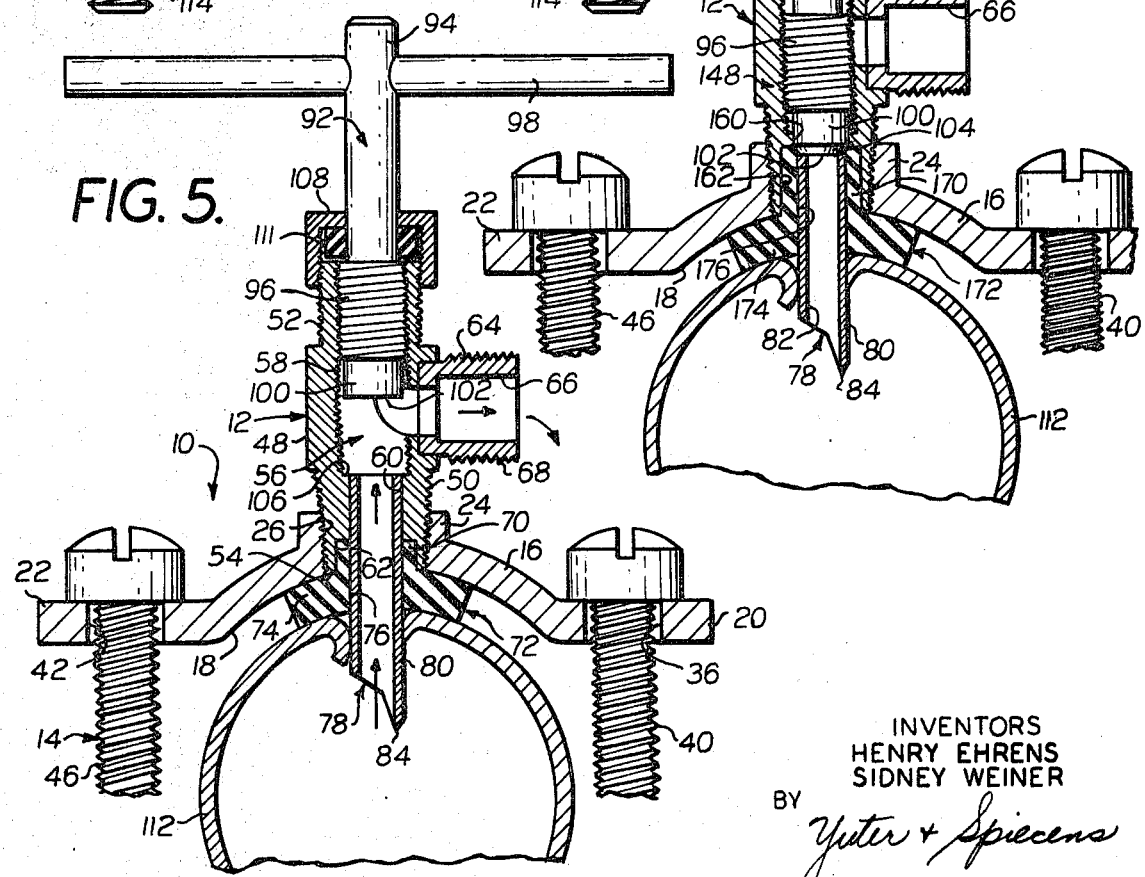
INVENTORS
HENRY EHRENS
SIDNEY WEINER
BY *Yuter + Spiecens*
ATTORNEYS.

SELF-TAPPING VALVE

This invention relates generally to a self-tapping valve and, more particularly, pertains to a self-tapping valve which is operable to remove fluid from or inject fluid into an existing pipeline or conduit.

There are presently a number of methods for tapping into a fluid carrying member to either remove fluid from or inject fluid into the member. However, all of these techniques suffer from various drawbacks which make them uneconomical to use either in terms of labor or in terms of material.

For example, the most widely used method for applying a so-called tap valve to a pipeline requires the operator to first shut off the fluid flow and drain the pipeline. Thereafter, a hole is drilled in the pipeline and the operator positions the valve over and in communication with the hole and, finally, attaches the valve to the pipeline. The fluid may then be turned on. It is obvious that this procedure is extremely time consuming and expensive in terms of labor since the pipeline must be drained and the valve positioned directly over the hole. Additionally, in many installations it is simply not feasible to turn off the fluid supply, as in a distribution system where the main feed line runs underground beneath a heavily traveled street and is highly inaccessible. Moreover, any operation involving drilling presents a danger of shock hazard.

In an effort to ameliorate the above situation, self-tapping valves have been proposed wherein a valve is placed on a pipeline and is then operated to produce a passage in the pipeline so that fluid may flow through the valve. However, at present, such self-tapping valves are relatively massive and costly since they are usually designed for use with steel piping and the like. If they are applied to thin-walled or lightweight tubing such as copper they become extremely uneconomical and, additionally, they may easily crush such material.

Accordingly, an object of the present invention is to provide an improved self-tapping valve specifically adapted for use with thin-walled or lightweight tubing.

A more specific object of the invention is to provide a self-tapping valve which is readily and easily applied to a fluid carrying pipeline while fluid flows through the line thereby eliminating the need to drain the pipeline.

Another object of the invention resides in the novel details of construction which provide a valve of the type described which is lightweight in construction and economical to manufacture.

A further object of the invention resides in the provision of a self-tapping valve which is efficient and reliable in operation.

Accordingly, a self-tapping valve constructed in accordance with the present invention for use with a fluid carrying member comprises a valve body adapted to be connected to the fluid carrying member. A bore is provided in the valve body and a fluid passageway communicates with said bore. Movably received within the bore is a piercing element having a passage therethrough. An axially movable valve stem is received in the bore and is movable in a first direction to engage and cause said piercing element to pierce the fluid carrying member, and in a second direction away from the piercing element. The valve stem is provided with a piercing element engaging surface for sealing the piercing element passage when the valve stem is in engagement with the piercing element to prevent fluid flow therethrough.

A feature of the present invention is to provide a self-tapping valve of the type described which includes a novel piercing element for easily piercing tubing fabricated from copper and the like.

Other features and advantages of the present invention will become more apparent from a consideration of the following detailed description when taken in conjunction with the accompanying drawings, in which:

FIG. 4 is a sectional view similar to FIG. 2, illustrating the position of the parts after a piercing operation with the valve in the valve-closed position;

FIG. 5 is a sectional view similar to FIG. 2, illustrating the position of the parts comprising the valve after a piercing operation with the valve in the valve-open position; and FIG. 6 is a sectional view of a modified embodiment of a valve constructed according to the present invention, with the parts comprising the valve in the valve-closed position after a piercing operation.

Figure 1:
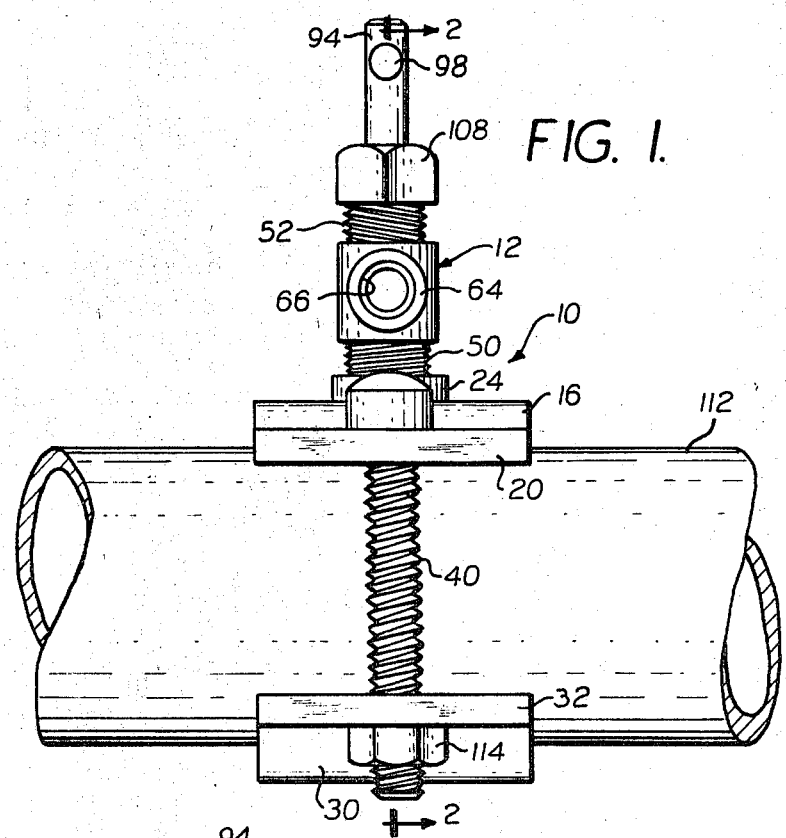
FIG. 1 is a side elevational view of a self-tapping valve constructed according to the present invention.

For purposes of illustration, the valve of the present invention is described as fluid flow from a pierced conduit to an external device. However, this operation is not to be interpreted as a limitation of the invention since the valve is a so-called two-way valve which can control fluid flow from an external device to the pierced conduit or pipeline.

Accordingly, a self-tapping valve constructed according to the present invention is designated generally by the reference numeral 10 in the FIGS. and generally includes a valve portion 12 and a bracket portion 14. More specifically, the bracket portion 14 includes a top bracket 16 having a central concave upwardly portion 18 and outwardly extending ears 20 and 22. The central portion 18 includes an upwardly extending boss 24 through which a threaded bore 26 extends.

The bracket portion 14 further includes a bottom bracket 28 having a central V-shaped portion 30 and outwardly extending ears 32 and 34 which underlie the ears 20 and 22, respectively, when the bracket is assembled. Provided in the ears 20 and 32 are respective aligned apertures 36 and 38 which are adapted to receive a screw 40 therethrough. Similarly, the ears 22 and 34 are provided with respective aligned apertures 42 and 44 which are adapted to receive a screw 46 therethrough.

The valve portion 12 of the present invention includes a valve body 48 having a lower externally threaded portion 50 and an upper externally threaded portion 52. The threaded portion 50 is threadedly received in the bore 26. Additionally, the bottom surface 54 of the valve body is screwed flush with the bottom surface of the central portion 18 of the upper bracket 16 and is contoured similarly to the central portion 18 to eliminate any discontinuities in the surface 18. Provided in the valve body 12 is a central through bore which is designated generally by the reference numeral 56. The bore 56 includes a threaded portion 58 which extends to the top of the valve body 48, a reduced diameter lower portion 60 and a lower enlarged annular recess 62 which extends to the bottom surface 54. The threaded portion 58 and the reduced diameter portion 60 of the bore 56 define an annular shelf 106 therebetween. Mounted on the valve body 48 is a nipple 64 having a fluid passageway 66 therein which communicates with the through bore 56 to provide a passage for the entrance or exit of fluid through the valve. The nipple 64 is externally threaded at 68 to receive a compression nut (not shown) or the like.

Received within the bottom recess 62 is the upstanding boss 70 of a gasket 72 which is fabricated from a resilient material such as rubber, neoprene or the like. Integral with the boss 70 is a curved section 74 which substantially matches the radius of curvature of the central portion 18 of the bracket 16 and abuts the lower surface thereof. It is to be noted that the curved portion 74 extends beyond the surface 54 of the valve body 48. The gasket 72 is provided with a central bore 76 coaxial with the bore 56. The piercing element 78 is slidably received in the bore 76 and the bore portion 60. Additionally, gasket 72 is deformable.

Figure 3:
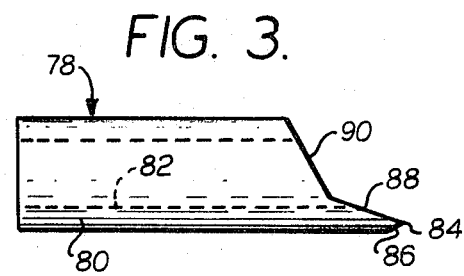
FIG. 3 is a side elevational view of the piercing element of the valve of FIGS. 1 and 2, to an enlarged scale.

More specifically, one embodiment which the piercing element 78 may take is illustrated in FIG. 3 and includes a tubular or circular member 80 having a central passageway 82. The member 80 is provided with a piercing point 84 which is connected to one surface of the circular wall of the member 80 by a relatively short angulated portion 86 and to the surface lying in a plane opposite the one surface of the member 80 via a first rearwardly and upwardly tapering edge 88 and a second upwardly and rearwardly extending edge 90, as taken in FIG. 3. The edge 90 makes a substantially greater angle with the peripheral wall of the member 80 than does the edge 88. In practice, a piercing member was fabricated wherein the edge 90 made a 30° angle with respect to the circular wall of the member 80 and the edges 86 and 88 subtended arcs of 22.5° with respect to a line drawn parallel to the axis of the member 80 and extending through the point 84. However, it is to be noted that the specific shape of the element 78 and the particular angles disclosed above are for illustrative purposes only and are not to be interpreted as being a limitation of the present invention. That is, the present invention contemplates the use of any type of piercing element which will pierce a pipeline.

Threadedly received in the upper portion 58 of the valve bore 56 is a valve stem designated generally by the reference numeral 92. The valve stem 92 includes a spindle 94 having a threaded portion 96 which is threadedly engaged in the threaded portion 58 of the bore 56 so that rotation of the spindle 94 affects axial movement thereof. Fixedly received in the spindle 94 adjacent the upper end thereof is a transversely extending handle 98 to facilitate rotation of the spindle. The lower portion of the spindle 94 is provided with a reduced diameter section 100 having a bottom piercing element engaging surface 102. The surface 102 is slightly larger in diameter than the bore portion 60 and is adapted to seat on the shelf 106 between the threaded portion 58 and the reduced diameter portion 60 of the valve bore 56.

Threadedly received on the threaded portion 52 of the valve body 48 is a gland nut 108 having packing 111 therein which surrounds the spindle 94 of the valve stem 96 to prevent leakage of the fluid along the spindle 94.

Figure 2:
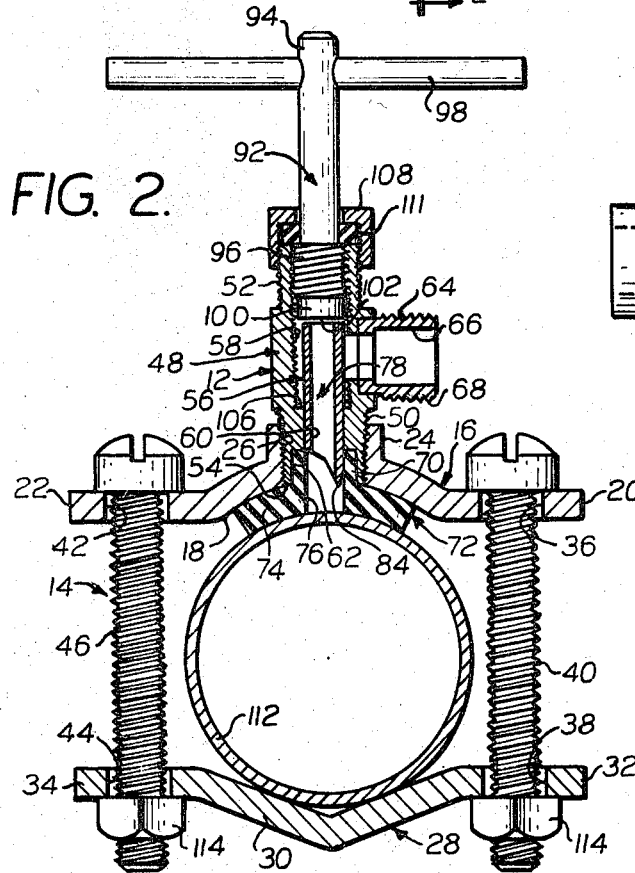
FIG. 2 is a sectional view taken along the line 2–2 of FIG. 1, illustrating the position of the parts comprising the valve prior to a piercing operation.

In operation, the elements comprising the valve of the present invention are positioned as shown in FIG. 2. That is, the valve stem 92 is rotated so that it is spaced above the piercing element 78. The piercing element 78 is moved upwardly manually in the bore 56 so that the piercing point and is spaced above the bottom surface of the gasket 72. It is to be noted that there is sufficient friction between the inner walls of the gasket 72 and the piercing element 78 to maintain the piercing element 78 in position. The upper bracket 16 is then placed over a pipeline such as a fluid carrying member 112 and the lower bracket 30 is placed beneath the pipeline with the apertures 38 and 44 in alignment with the respective apertures 36 and 42. The screw 40 is inserted through the apertures 36 and 38 and the screw 46 is inserted through the apertures 42 and 44. Nuts 114 are threaded onto the ends of the screws 40 and 46 and are tightened against the respective ears 32 and 34 to maintain the valve 10 in place. It is to be noted that the nuts 114 are tightened sufficiently against the lower bracket 28 to cause the curved section 74 of the gasket 72 to be compressed between the pipeline or conduit 112 and the lower surface f of the bracket 16 to prevent any leakage about the hole which is to be made in the pipeline.

The valve stem 92 is rotated to move the spindle 94 downwardly until the surface 102 engages the upper edge of the piercing element 78. It is to be noted that the diameter of the surface 102 is larger that than the passageway 82 in the piercing element 78 so that when the spindle 94 engages the piercing element the passageway 82 is sealed by the surface 102. Continued downward movement of the valve stem 92 effects a concomitant downward movement of the piercing element 78. The point 84 of the piercing element engages the outer wall of the pipeline 112 and pierces the same as the valve stem 92 is screwed downwardly in the valve body 48. As the point 84 enters the pipeline 112, it folds and bends back a portion 114 of the wall forming the pipeline, as shown in FIG. 4.

It is to be noted that as the valve stem 92 moves downwardly the surface 102 remains in engagement with the piercing element 78 thereby maintaining the passage 82 sealed. Hence, even though the piercing element 78 pierces the pipeline or conduit 112 and continues its downward movement, no fluid can exit through the sealed passage 82. The downward movement of the valve stem 92 is maintained until the surface 102 seats on the shelf 106 thereby to provide a positive shut off which seals the valve.

More specifically, the relative position of the elements comprising the valve of the present invention will be as shown in FIG. 4 wherein the top edge of the piercing element 78 is substantially flush with the shelf 106 and the surface 102 is seating on the shelf 106. The element 78 is maintained in this position by its frictional engagement with the wall defining the bore 76 in the gasket 72 and its frictional engagement with the pipeline 112. Thus, in this valve-closed position of the elements, the seating of the surface 102 on the shelf 106 seals the passage 82 in the piercing element 78 as well as the bore 60 to prevent any fluid flow. It is to be noted that either before or after the aforementioned operation, a utility device may be connected to the valve 10 via the threaded nipple 64.

When fluid flow through the valve is desired, the valve stem 92 is rotated in the opposite direction to raise the valve stem and unseat the surface 102 from the shelf 106. FIG. 5 illustrates the position of the elements comprising the valve 10 when the valve is in this valve-open position. Accordingly, fluid will flow through the passage 82 in the piercing element 78, and through the valve bore 56 and the fluid passageway 66 in the nipple 64 to the utility device.

When it is desired to stop fluid flow, the valve is moved to the valve-closed position simply by rotating the valve stem 92 so that the spindle 94 is moved axially downwardly until the surface 102 again seats on the shelf 106 to seal the valve.

Accordingly, a self-tapping valve has been disclosed which is simple and reliable in operation and which is economical to produce and is specifically adapted for use in conjunction with thin-walled tubing such as lightweight copper tubing and the like.

FIG. 6 illustrates a modified embodiment of a valve constructed according to the present invention. This valve construction is similar to the valve construction illustrated in FIGS. 1—5 and similar reference numerals indicate identical elements. Accordingly, only the differences between the valve shown in FIG. 6 and the valve shown in FIGS. 1—5 will be described.

Thus, the valve 110 of FIG. 6 includes a valve body 148 having a central through bore 156. The upper portion of the through bore 156 is threaded at 158 to receive the threaded portion 96 of a valve stem 192. Similarly to the embodiment of FIGS. 1—5, the valve body 148 includes a lower recess 162 which receives the upstanding boss 170 of the gasket 172. It is to be noted that the boss 170 is of greater height than the boss 70. The piercing element 78 is slidingly received in the bore 176 in the gasket 172. Additionally, the valve bore 156 includes a reduced diameter portion 160 through which the reduced diameter section 100 of the valve stem 192 is adapted to move. Additionally, the section 100 is provided with an annular chamfer 104.

In operation, the valve stem 192 of the valve 110 is moved upwardly in the bore 156 and the piercing member 78 is pushed upwardly into the valve so that the point 84 is received within or is flush with the bottom surface of the gasket 172. Thereafter, the valve 110 is mounted on a pipeline 112 in the same manner as the valve 10 is mounted on a pipeline. The valve stem 192 is screwed downwardly so that the piercing element 78 pierces the pipeline 112. The downward movement of the valve stem continues until the chamfer 104 of the valve stem 92 engages and slightly deforms the upper edge of the gasket 172 thereby to form a seat to seal the valve. Accordingly, FIG. 6 illustrates the position of the elements after this operation has been performed. That is, FIG. 6 illustrates the position of the elements in the valve-closed position.

It is to be noted that the aforementioned operation of the valve 110 is similar to that of the valve 10. That is, while the piercing element 78 is piercing the pipeline 112 the passage 82 is sealed by the surface 102 of the valve stem 192 to prevent fluid leakage. Additionally, the engagement of the section 100 of the valve stem with the boss 170 causes the gasket 172 to tightly grip the chamfer 104 thereby to form a seal after the piercing operation has been completed.

When it is desired to effect fluid flow through the valve, the valve stem 192 is rotated in the opposite direction to move the valve stem upwardly. This s action unseats the section 100 from the boss 170 of the gasket 172 so that the fluid now flows from the pipeline 112 through the passageway 82 in the piercing element 78, through the portion 158 of the bore 156 and through the passageway 66 in the nipple 64 to the device connected thereto. As in the embodiment shown in FIGS. 1—5, the piercing element 78 is maintained in place in the embodiment of FIG. 6 by the frictional engagement of the gasket 72 and the pipeline 112 with the piercing element. The valve of FIG. 6 may be closed in the conventional manner be by moving the valve stem 92 downwardly until the section 100 again seats on the boss 170.

While preferred embodiments of the invention have been shown and described herein it will become obvious that numerous omissions, changes and additions may be made in such embodiments without departing from the spirit and scope of the present invention.

We claim:

1. A tap valve for use with a fluid carrying member comprising a valve body adapted to be connected to the fluid carrying member, a bore in said valve body, a fluid passageway communicating with said bore, a piercing element movable in said bore and having a passage therethrough, and an axially movable valve stem in said bore movable in a first direction to engage and cause said piercing element to move in said first direction to pierce said fluid carrying member and in a second direction away from said piercing element, said valve stem being provided with a piercing element engaging surface for sealing said piercing element passage when said valve stem engages said piercing element to prevent fluid flow therethrough.

2. A tap valve as in claim 1, and an annular shelf in said valve body bore intermediate the ends thereof and positioned in the path of movement of said valve stem to provide a seat for said valve stem to seal said valve.

3. A tap valve as in claim 1, and a recess in said valve body, gasket means received in said recess and extending beyond the bottom edge of said valve body and positioned to be compressed between said fluid carrying member and the bottom edge of said valve body, and a bore in said gasket means slidably receiving said piercing element therein.

4. A tap valve as in claim 3, in which said gasket means is fabricated from a deformable material, said valve stem having a gasket-engaging surface adjacent said piercing element engaging surface adapted to engage and seat on said gasket means to seal said valve.

5. A tap valve as in claim 1, in which said valve includes mounting means for mounting said valve on the fluid carrying member, said mounting means including an upper bracket member contoured to fit about a first portion of the fluid carrying member, and a lower bracket portion adapted to fit about a second portion of the fluid carrying member and to be releasably connected to said upper bracket member, said upper bracket member being connected to said valve body.

6. A tap valve as in claim 1, in which at least a portion of said valve body bore is threaded, said valve stem including a threaded portion the threadedly engaged with the threaded portion of said valve bore whereby rotation of said valve stem effects axial movement thereof, and a portion depending from said threaded portion of said valve stem, the bottom surface of said depending portion forming said piercing element engaging surface.

7. A tap valve as in claim 1, in which said piercing element includes a tubular member having a circular wall and a pointed end, a first angulated edge connecting said pointed end with a first portion on said circular wall, and at least a second angulated edge connecting said pointed end with a second portion on said circular wall.

8. A tap valve as in claim 1, in which said piercing element includes a tubular member having a circular wall and a pointed end, a first angulated edge connecting said pointed end with a first portion of said circular wall, a second angulated edge extending rearwardly from said pointed end, and a third angulated edge connecting said second angulated edge with a second portion of said circular wall, said first and second angulated edges subtending substantially equal arcs with respect to a line parallel to the axis of said tubular member and passing through said pointed end.

9. A piercing element for a tap valve of the type including a valve body adapted to be connected to a conduit, a through bore in said valve body slidably receiving the piercing member therein, and an axially movable valve stem in said valve body operable to engage said piercing element and cause said piercing element to pierce the conduit; said piercing element comprising a tubular member having a central passage defined by a circular wall and a pointed end, a first angulated edge connecting said pointed end to a first portion of the circular wall, and a second angulated edge connecting said pointed end to a second portion of said circular wall.

10. A piercing element as in claim 9, in which said second angulated edge includes a first angulated section extending rearwardly from said pointed end, and a second angulated section extending between said first angulated section and said second portion of said circular wall, said second portion of said circular wall lying in a plane opposite to the plane in which said first portion lies.

11. A piercing element as in claim 10, in which said first angulated edge and said first angulated section subtend substantially equal arcs with respect to a line drawn through said pointed end parallel to the axis of said tubular member.

12. A tap valve for use with a fluid carrying member comprising a valve body adapted to be connected to the fluid carrying member, a bore in said valve body, a fluid passageway communicating with said bore, a piercing element movable in said valve body, a valve stem in said valve body movable in a first direction to engage and move said piercing element to effect a piercing operation in a second direction away from said piercing element, and seating means in said valve body for engaging said valve stem to seal said valve.

13. A tap valve as in claim 12, in which said piercing element is provided with a fluid passage.

14. A tap valve as in claim 13, in which said valve stem is provided with a sealing surface to seal said piercing element fluid passage when said valve stem engages said piercing element.

UNITED STATES PATENT OFFICE
CERTIFICATE OF CORRECTION

Patent No. 3,554,217      Dated January 12, 1971

Inventor(s) Henry Ehrens et al.

It is certified that error appears in the above-identified patent and that said Letters Patent are hereby corrected as shown below:

Column 2, line 14, after "as" insert -- controlling --; line 45, "12" should read -- 48 --; line 71, "circular" shou read -- cylindrical --. Column 3, line 45, "30" should read -- 28 --; line 56, cancel "f". Column 5, line 7, cancel "s" Column 6, line 2, cancel "the", first occurrence; line 52, after "operation" insert -- and --.

Signed and sealed this 1st day of June 1971.

(SEAL)
Attest:

EDWARD M. FLETCHER, JR.       WILLIAM E. SCHUYLER, J
Attesting Officer       Commissioner of Patent